May 12, 1925.
O. J. SALISBURY
1,537,195
APPARATUS FOR FILTERING AND FOR FORMING ARTICLES FROM PULP SOLUTIONS
Filed Sept. 13, 1921  4 Sheets-Sheet 2
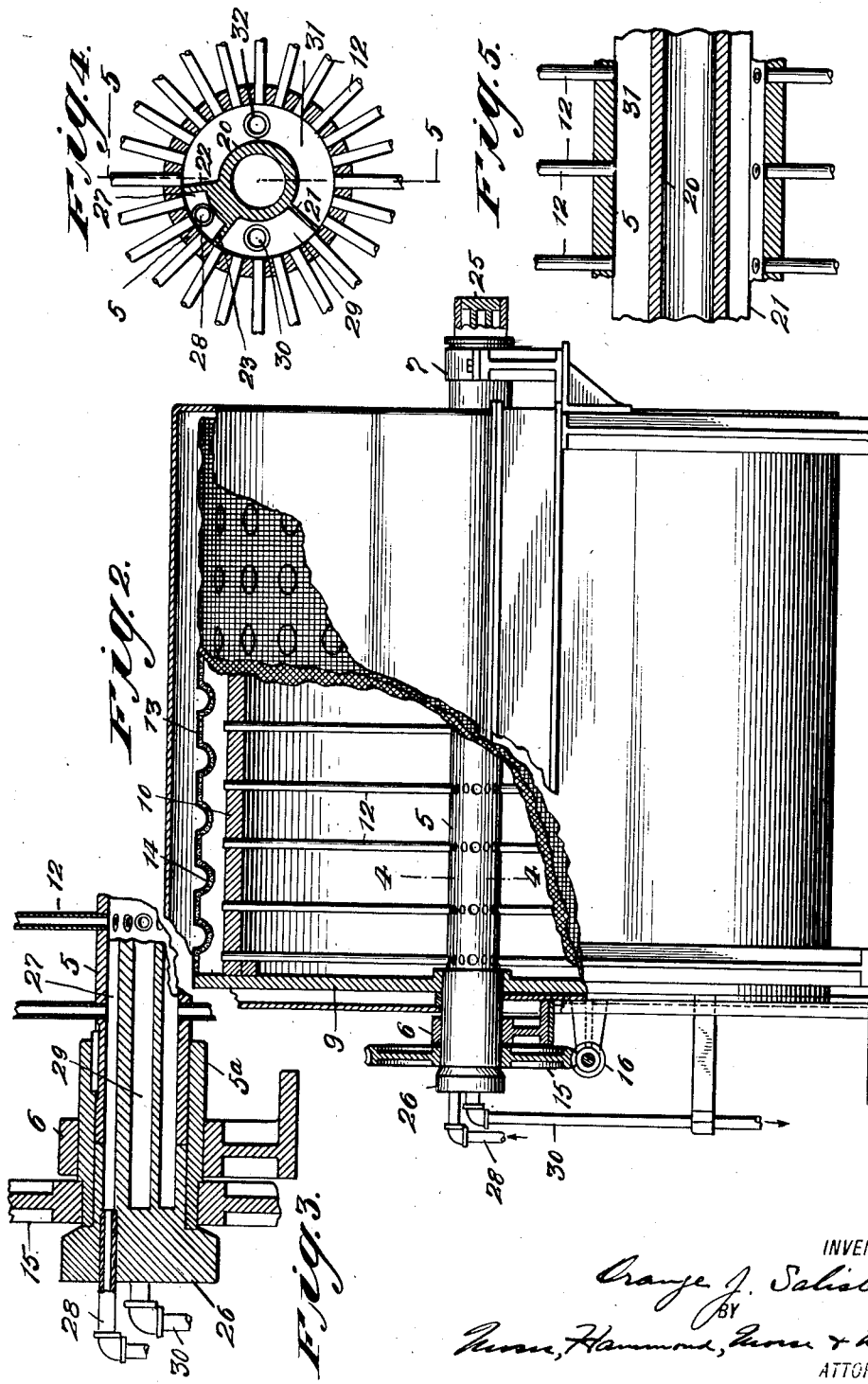
INVENTOR
Orange J. Salisbury
BY
ATTORNEYS

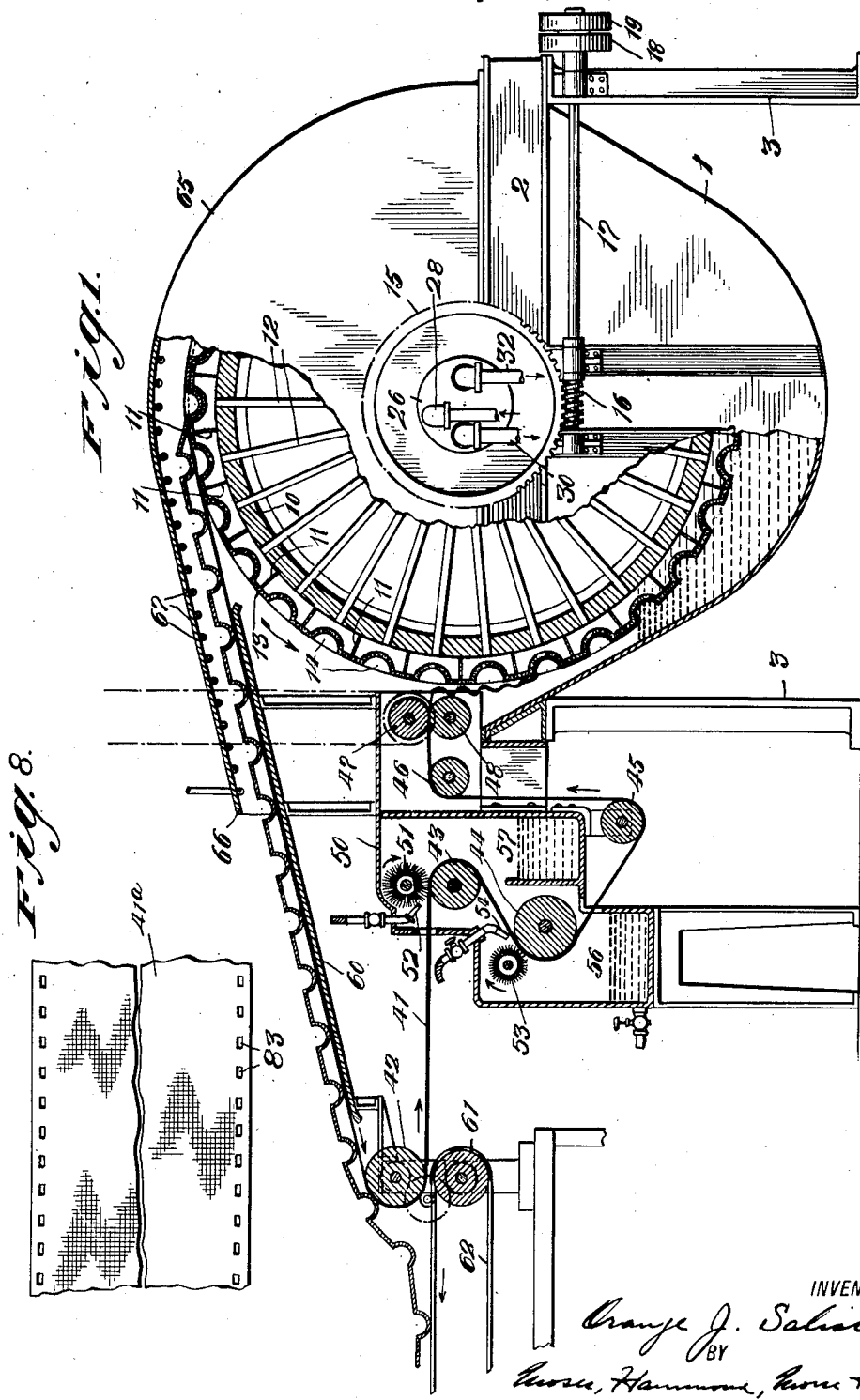

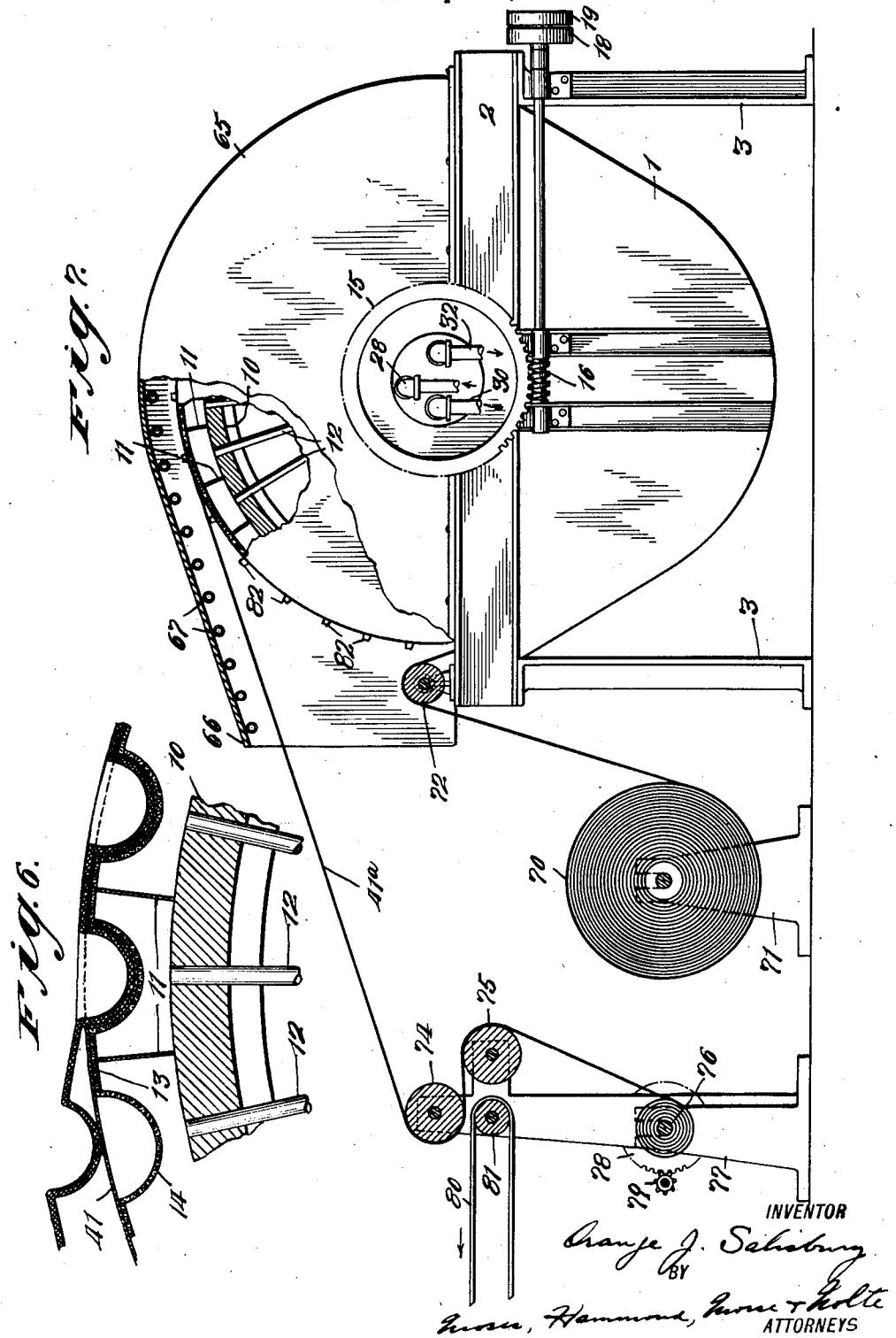

May 12, 1925.
O. J. SALISBURY
1,537,195
APPARATUS FOR FILTERING AND FOR FORMING ARTICLES FROM PULP SOLUTIONS
Filed Sept. 13, 1921   4 Sheets-Sheet 4
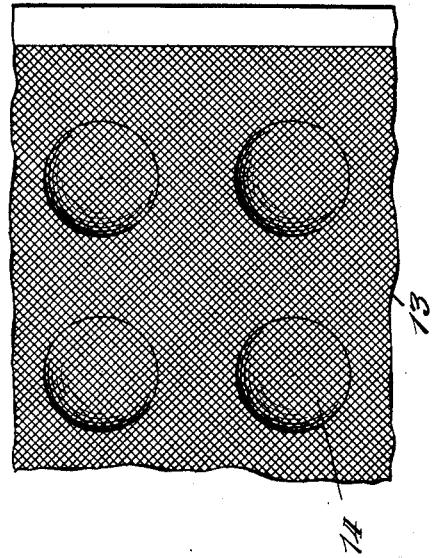
INVENTOR
ATTORNEYS Patented May 12, 1925.

1,537,195

UNITED STATES PATENT OFFICE.

ORANGE J. SALISBURY, OF SALT LAKE CITY, UTAH.

APPARATUS FOR FILTERING AND FOR FORMING ARTICLES FROM PULP SOLUTIONS.

Application filed September 13, 1921. Serial No. 500,300.

*To all whom it may concern:*

Be it known that I, ORANGE J. SALISBURY, a citizen of the United States, residing in Salt Lake City, county of Salt Lake, and State of Utah, have invented certain new and useful Improvements in Apparatus for Filtering and for Forming Articles from Pulp Solutions, of which the following is a specification.

When used for filtering, the invention is particularly useful in connection with the filtration of metallurgical slimes, ores, concentrates and residues, the filtration of products and waste materials encountered in the manufacture of sugar and its products, and the filtration of chemical precipitates, compounds and clays.

When used for forming articles, the invention is particularly adapted for the preparation of sheets and special forms made from fibrous pulps, such as hairy paper and wood pulps, and mixtures of fibrous, hairy and paper pulps with fillers and binders of various kinds, depending upon the article which is to be produced.

The invention will be understood from the following description of certain embodiments thereof which are shown in the accompanying drawings, in which, Figure 1 is a side elevation partly in section of a machine for forming a sheet of material having indentations therein; Figure 2 is an end elevation, partly in section, of the machine shown in Figure 1; Figure 3 is a fragmentary sectional elevation of a portion of the machine shown in Figures 1 and 2, illustrating particularly the construction whereby air suction and pressure are applied to the filter drum; Figure 4 is a fragmentary sectional elevation on the line 4—4 of Figure 2, illustrating particularly the hub of the filter drum; Figure 5 is a fragmentary sectional elevation on the line 5—5 of Figure 4; Figure 6 is a fragmentary sectional elevation showing the manner in which the deposited material leaves the drum of the machine shown in Figures 1 and 2; Figure 7 is a side elevation, partly in section, of a modified form of the invention; Figure 8 is a plan view of the web used in the machine shown in Figure 7; Figure 9 is a fragmentary plan view of a portion of the outside of the drum shown in Figures 1 and 2; Figure 10 is a side elevation of a portion of the sheet formed on the machine shown in Figures 1 and 2.

The form of the invention embodied in the machine shown in Figures 1 to 5 will first be described. In this machine, a tank 1, adapted to contain a pulp solution, is shown supported upon a frame 2 mounted on legs 3. Movable within tank 1 is a vacuum filter element in the form of a rotatable drum. As shown, this drum has a hollow shaft 5, mounted in bearings 6 and 7 supported on the tank frame. Rigidly secured to the shaft 5 are the drum heads 9. Between these drum heads and secured thereto is a cylindrical casing 10; and secured to the outside of this casing and extending longitudinally thereof are ribs 11 the outer edges of which lie in the cylindrical plane of the outer edges of the drum heads 9. The longitudinal troughs thus formed between the ribs 11 on the outside of the casing 10 are connected with the inside of the hollow shaft 5 by a plurality of pipes 12, the ends of which are set in holes in the casing 10 and in holes in the hollow shaft 5. Secured to the outer edges of the drum heads 9 and ribs 11 is a filter surface 13 which may be of wire mesh or filter fabric. In the machine of Figures 1 and 2, this filter surface 13 is shaped in conformity with the article to be made by being provided with semi-spherical indentations 14, as shown in Figures 1, 2 and 9. The filter drum is slowly rotated through a worm gear 15 secured to a sleeve 5ª keyed to one end of the shaft 5, with which gear meshes a worm 16 mounted on a shaft 17 journaled in bearings mounted on the legs 3, the end of shaft 17 being provided with fast and loose pulleys 18 and 19 belted to a suitable source of power. Within the hollow shaft 5, are certain suction and air-blast passages which are provided in a manner which will be clear from Figures 3, 4 and 5. As shown in these figures, there is arranged within the hollow shaft 5 a partitioning member having a cylindrical portion 20 from which extend radial fins 21, 22 and 23. The partitioning member at one end is provided with a hub portion 25 which closes the adjacent end of the hollow shaft 5; and at its other end the partitioning member is provided with a hub 26 which extends into and also preferably beyond the end of the sleeve to which the hollow shaft 5 is keyed and which is interposed between the bearing 6 and the hollow shaft. The partitioning member is held stationary, and the webs 21, 22 and 23 are in slipping engagement with the inside surface of the hollow shaft 5. There is thus provided an air blast passage 27 to which is connected a pipe 28; a suction passage 29 to which is connected a pipe 30; and another suction passage 31 to which is connected a pipe 32. The pipes 28, 30 and 32 are connected to their respective passages through the hub 26 of the partitioning member, and these pipes may serve to prevent such member from rotating. The pipe 28 is connected to a source of air under pressure; the pipe 30 is connected to a source of strong suction; and the pipe 32 is connected to a source of medium suction for purposes hereinafter explained in describing the operation of the machine.

Separable from the filter drum and arranged to move through the tank 1 and in contact with said filter drum, is a web 41 of some suitable fabric. During its passage within the tank 1 the web 41 is supported by the filter drum; and during its passage outside of the tank 1 the web runs over idler rollers 42, 43, 44, 45 and 46 and between drawing rollers 47 and 48. The idler rollers 43, 44, 45 and 46 serve to carry the web 41 through a cleaning chamber 50. One side of the belt is cleaned by a brush 51 driven in the direction of the arrow, the cleaning operation being assisted by jets of water from a row of nozzles 52 directed at the web 41 at about the point where it is engaged by the brush 51. The other side of the belt is cleaned in a similar manner by a brush 53 rotating in the direction of the arrow, with which cooperates a row of nozzles 54 directing water against the web. The cleaning chamber 50 is shown as provided with reservoirs 56 and 57 in which the cleaning water is collected, these reservoirs being drained in any suitable manner. The web 41, from a point near the top of the filter drum to a point near the roller 42, may be supported by a shelf 60. Below the roller 42 is a roller 61 carrying a conveyor belt 62 which is driven in the direction of the arrow at approximately the same speed as the speed of the web 41. The upper part of the filter drum is enclosed by a casing 65 which extends to the point 66, and in its upper part is provided with heating means such as transversely extending coils 67 of steam heated pipe.

The mode of operation of the machine shown in Figures 1 to 6 is as follows: A suitable pulp solution is supplied to the tank 1, and the machine is put in operation. During the revolution of the filter drum, the web 41, soon after it leaves the drawing rollers 47 and 48, is sucked into snug engagement with the periphery of the filter drum by the strong suction applied to the periphery of the drum during that portion of its travel as hereinbefore explained. While the web covered surface of the filter drum is submerged in the pulp solution, pulp from the latter is caused to be deposited upon the web 41 by the action of the medium suction applied, as hereinbefore described. During the depositing of the pulp, the filtered solution is carried away through the suction pipe 32 and, even after the deposited material leaves the solution, the suction which is continuously applied to it continues to remove moisture. This removal of moisture from the deposited material, after it has emerged from the solution, is facilitated by the fact that the air entering the casing 65 and drawn through the deposited material, is heated by the coil 67. When the deposited material reaches the top of the filter drum, the suction is cut off and replaced by an air blast controlled as hereinbefore described. This air blast not only helps the web 41 to become disengaged from the filter drum but also facilitates the loosening of the deposited sheet upon the web. After the deposited sheet leaves the casing 65, it continues to be carried along upon the web 41 until it reaches roller 42. At this point, the deposited sheet leaves the web 41 and is carried away by the conveyor belt 62. After the web 41 is cleared of the deposited sheet, it is cleaned by the brushes 51 and 53 in the manner hereinbefore described, and again passes into the tank 1 and around the filter drum.

The invention, as embodied in the machine shown in Figure 7, will not be described in detail. This machine is intended either merely for filtering or for the production of flat sheets. The tank casing, the drum driving mechanism and the means for supplying suction and an air blast to the periphery of the filter drum, are the same in this machine as in the machine shown in Figures 1 to 6, and are correspondingly numbered. The surface of the filter drum, however, instead of being provided with semi-spherical indentations, is a plane surface $13^a$ with the result that the material deposited thereon and on the web $41^a$ is thus caused to be merely a flat sheet. The machine of Figure 7 also differs from the machine of Figures 1 to 6 in that no means are provided for cleaning the web $41^a$. As shown, the web is supplied from a roll 70 mounted in trunnion 71, an idler roller 72 being provided for guiding the web into the tank. After passing through the tank in engagement with the drum, and over the idler rollers 74 and 75, the web is wound up into a roll on an arbor 76 mounted in trunnions 77 and driven at proper speed from a source of power through a gear 78 and pinion 79. For receiving the deposited material from the web $41^a$, there may be provided a conveyor belt 80, having approximately the same speed as the speed of the web, said belt being carried by a roller 81 which may be journaled in the frame 77. In the machine of Figure 7, the peripheries of the drum heads are preferably, although not necessarily, provided with lugs 82 arranged to enter openings 83 in the edge of the web 41ª, the latter being shown in Figure 8.

The mode of operation of the machine shown in Figure 7 is similar to that of the machine shown in Figures 1 to 6. The pulp solution or the solution to be filtered is supplied to the tank 1 and the machine is put in operation. As in the machine previously described, the material deposited upon the web 41ª is partially dried by the heat of the coils 67 and the suction which continues to be applied to the material after it leaves the solution; and at the top of the drum the material is loosened from the web 41ª by the action of the air blast. The deposited material in the form of a flat sheet leaves the web 41ª where the latter passes over the roller 74, and is carried away by the conveyor belt 80. During the operation of the machine, the web 41ª is unwound from the roll 70 and is wound up on the arbor 76. When the web has been transferred from the roll 70 to the arbor 76, another roll of web may be substituted and the used roll may be removed and cleaned in any suitable manner.

While I have shown certain forms in which my invention may be embodied, it is to be understood that these are merely illustrative and that the invention may be embodied in many other styles of machine adapted for filtration or for forming articles of various kinds.

What I claim is:

1. In a machine of the character described, a tank adapted to contain a pulp solution, a vacuum filter drum rotatable in said tank, mold elements on said drum, a web separable from said drum and arranged to move through said tank in contact with the mold elements, means for supporting said web outside of said tank so that said web will act as a conveyor of the material deposited upon said belt, and means for drying the material while it is being conveyed away from the filter drum.

2. In apparatus for forming articles from pulp solutions a strong suction means for seating a filtering surface and a suction means of lesser strength for the precipitation of pulp from said solution upon the surface aforesaid.

3. In apparatus for forming articles from pulp solutions a filter web, means for exerting a strong suction through said web to bring it to position and a second modified suction means exerted after the said web is positioned, for the purpose of causing pulp precipitation thereon.

4. Means for the continuous production of articles from pulp solution precipitates, comprising a mould drum, a pulp tank, a web, and a cleaning means, said mould drum partially submerged in the solution in said pulp tank, said web partially encircling said drum and interposed between the moulds thereon and the aforesaid solution in the tank but separable from said drum, said cleaning means adapted to engage said web when separated from said drum to clean the same.

5. Means for the continuous production of articles from pulp, comprising a suction drum, an article shaping surface on the drum, a pulp tank, and a web, interposed between the article shaping surface and the pulp in the tank, and means to rotate the drum and web in the tank.

In testimony whereof I have affixed my signature to this specification.

ORANGE J. SALISBURY.